United States Patent Office 3,459,534
Patented Aug. 5, 1969

3,459,534
METHODS OF CONTROLLING BACTERIA, FUNGI, NEMATODES AND WEED PESTS WITH TETRAHALOHYDROXYBENZAMIDES
Edwin Dorfman, Grand Island, and Edward D. Weil, Lewiston, N.Y., assignors to Hooker Chemical Corporation, Niagara Falls, N.Y., a corporation of New York
No Drawing. Continuation-in-part of application Ser. No. 241,128, Nov. 30, 1962. This application Nov. 29, 1965, Ser. No. 510,375
Int. Cl. A01n 9/20
U.S. Cl. 71—118         8 Claims This is a continuation-in-part of our application S.N. 241,128, filed Nov. 30, 1962, now U.S. Patent 3,342,859.

This invention relates to pesticidal methods utilizing novel amides of perhalogenated hydroxybenzoic acids.

The novel amides employed in the method of the present invention are represented by the following formula:

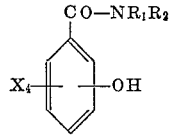

wherein X is selected from the group consisting of chlorine and bromine (preferably chlorine) and $R_1$ and $R_2$ are substituents selected from the group consisting of hydrogen, alkyl (from 1 to about 20 carbon atoms), phenyl, benzyl, halophenyl (preferably chlorophenyl), alkylphenyl (wherein the alkyl is preferably of from 1 to about 20 carbon atoms) and nitrophenyl. When $R_1$ and $R_2$ are alkyl, they may optionally be conjoined directly by a carbon-to-carbon bond or through a hetero-atom such as oxygen, sulfur or nitrogen to form a ring chain, preferably, of up to about 12 carbon atoms. The products may be isomer mixtures. Preferred compounds are those wherein the OH is in the ortho- position.

It has now been found that these compositions exhibit a high degree of molluscicidal activity as well as anti-microbial, fungicidal, nematocidal and herbicidal properties.

Typical of the perhalogenated hydroxybenzoic acid amides which may be employed as pesticides in accordance with the present invention are, for example, N-methyl-, N-ethyl-, N-propyl-, N-butyl-, N-amyl-, N-octyl-, N-decyl-, N-dodecyl-, N-stearyl-, N,N-dimethyl-, N,N-diethyl-, N,N-dipropyl-, N,N-diisopropyl-, N,N-dibutyl-, N,N-diamyl-, N,N-dioctyl-, N,N-didecyl-, N,N-didodecyl-, N-methyl-N-butyl-, N-methyl-N-lauryl-, N,N-diallyl-, N-benzyl-, N-phenyl-, N-o-chlorophenyl-, N-m-chlorophenyl-, N-p-chlorophenyl-, N-p-bromo phenyl-, N-2,5-dichlorophenyl-, N-3,4-dichlorophenyl-, N-3,4-dibromophenyl-, N-3,4,5-trichlorophenyl-, N-o-tolyl-, N-m-tolyl-, N-p-tolyl-, N-3,4-xylyl-, N-3-chloro-4-methylphenyl-, N-3-methyl-4-chlorophenyl-, N-p-tertiarybutylphenyl-, N-o-nitrophenyl-, N-m-nitrophenyl-, N-p-nitrophenyl-, and N-2,4-dinitrophenyltetrachlorohydroxybenzamide, tetrachlorohydroxybenzopyrrolidide, tetrachlorohydroxybenzomorpholide and tetrachlorohydroxybenzopiperidide, to name a few examples. The corresponding bromine derivatives may also be employed, as may mixed halogenated compounds, provided that all such compounds have four halogens on a benzene nucleus.

Preferred embodiments, because of high molluscicidal, high bacteriostatic activity and realtively low costs, are the N-phenyl-, N-(chlorine-substituted)phenyl-, N-(nitro-substituted)phenyl-, and N-(lower alkyl-substituted)phenyl tetrachlorohydroxybenzamides or utilizing alternative nomenclature, the tetrachlorohydroxybenzanilides having either no substituent or having chlorine, nitro or lower alkyl substituents on the aniline moiety. In particular, the 4'-chloro and 3',4'-dichloro-substituted tetrachlorohydroxybenzanilides were found to be especially outstanding bacteriostats and molluscicides. Most preferred within this group are the o-hydroxy-tetrachlorobenzanilides (tetrachlorosalicylanilides).

The hydroxytetrachlorobenzanilides of the present invention are highly anti-microbial and relatively non-injurious to mammalian skin. Thus, they are particularly useful as additives for soap, detergents, deodorants and other washing and cosmetic preparations for human and animal use.

Although many lower halogenated hydroxybenzoic acid derivatives are known, considerable difficulty has been encountered in attempts to prepare tetrachlorohydroxybenzamides having four chlorine atoms on the hydroxy-substituted benzene ring. For example, the attempted chlorination of salicylamides gives substitution on the side chain in preference to perchlorination of the salicylic ring. Tetrachlorosalicylic acid amides have been hitherto unaccessible compounds.

A surprising and unexpected route to tetrachlorohydroxybenzamides has now been discovered. When pentachlorobenzamides are treated with a strong base in the presence of certain specific organic co-solvents, especially ethylene glycol or methanol, the expected saponification of the amide linkage does not occur, but rather a chlorine atom is displaced from the pentachloro-benzoyl moiety giving a tetrachlorohydroxybenzoyl moiety. The products are a mixture of all three isomers (o, m, and p-hydroxybenzamide isomers) as can be shown by three inflections in a potentiometric acid-base titration curve. By resolution into the components by crystallization, they can be shown to be predominantly the ortho-hydroxy and para-hydroxyl isomers.

That the amide linkage does not cleave is surprising in view of the vast number of examples of splitting of the —CO—NR— group by strong bases.

The compounds employed in the present invention may be prepared in the following manner. A pentachlorobenzamide of the structure

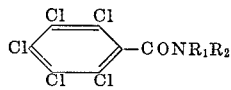

where $R_1$ and $R_2$ correspond to the groups defined in the product structure given above, is heated with at least two molar equivalents of a strong base dissolved in a solvent quantity of ethylene glycol or methanol, until a substantial fraction of one molar equivalent of chloride ion has been released. The strong base should be capable of forming the alcoholate of the ethylene glycol or methanol. Suitable bases are, for example, sodium hydroxide, potassium hydroxide, lithium hydroxide, and sodium hydride. Also, the pre-formed alcoholate, such as $NaOCH_3$ or

may be employed, or an alkali metal may be added to the solvent to form the alcoholate. Reaction temperatures of from 120 degrees centigrade to 200 degrees centigrade are preferred, and reaction times of from one-half hour (at the higher temperatures) to several days (at the lower temperatures) are used. Atmospheric pressure may be used where ethylene glycol is the chosen solvent, whereas an autoclave should be used with methanol because of its superatmospheric pressure at the reaction temperature.

The initial product is the alkali metal salt of the hydroxybenzamide. While for many purposes said salts are useful per se, it is found efficacious to purify the product by converting it to the free acid (phenolic) form of the hydroxybenzamide by acidification of the reaction mixture by adding any acid having a $pK_a$ less than that of the product. Suitable acids are, e.g., mineral acids, such as hydrochloric or sulfuric acid. To cause the acid to precipitate from solution on acidification it is convenient to dilute the reaction mixture with water. The precipitated product may then be isolated by filtration, centrifugation, or extraction with a solvent. Analogous processes start with pentabromobenzamides.

The following examples serve to illustrate the invention but are not intended to limit it thereto. In the examples all parts are by weight and temperatures are in degrees centigrade unless otherwise indicated.

Example 1.—Preparation of tetrachlorohydroxybenzo-p-chloroanilide 0.111 gram mole of 2,3,4,4',5,6-hexachlorobenzanilide, 0.223 gram mole of NaOH and 320 grams of ethylene glycol were heated at 140 degress for 43 hours. The reaction was nearly complete as determined by Volhard chloride analysis. The reaction mixture was poured into water and filtered, removing a small amount of insoluble material. The filtrate was acidified. The precipitate was filtered out, washed and dried. The product, an isomeric mixture, was extracted with hot hexane to remove soluble impurities and was dried to yield 10 grams of colorless solid product, having a neutralization equivalent of 385 (theory 385.5).

Analysis.—Calculated for $C_{13}H_6O_2NCl_5$: N, 3.64 percent. Found: N, 3.54 percent.

Fractional crystallization of the mixed isomer product, from ethyl alchol and aqueous ethyl alcohol, yielded two pure isomers. The major component was an isomer having a melting point of 200 to 201.5 degrees centigrade and the minor component was an isomer having a melting point of 264.5 degrees centigrade. Analyses for C, H, N and Cl indicated both isomers to be of the formula $C_{13}H_6Cl_5NO_2$.

A one gram portion of each isomer was hydrolyzed by heating in 50 milliliters of concentrated sulfuric acid at 140 degrees for 8 to 10 hours. The sublimates from the reaction mixture were collected on a condenser and recrystallized from petroleum ether. The sublimate thus derived from the $C_{13}H_6Cl_5NO_2$ isomer having a melting point of 200–201.5 degrees centigrade was identified as 2,3,4,5-tetrachlorophenol, thus establishing the isomer as 2 - hydroxy - 3,4,5,6-tetrachlorobenzo-p-chloroanilide. Similarly the sublimate derived from the isomer having a melting point of 264.5 degrees centigrade was identified as 2,3,5,6-tetrachlorophenol, thus establishing the isomer to be 4-hydroxy-2,3,5,6-tetrachlorobenzo-p-chloroanilide.

Example 2.—Preparation of N-methyl tetrachlorohyroxybenzamide 0.11 gram mole of N - methyl-2,4,5,6-pentachlorobenzamide, 0.223 gram mole of NaOH and approximately 300 grams of ethylene glycol were heated at about 140 degrees centigrade until Volhard titration of a small aliquot showed that substantially the theoretical amount of chloride ion had been released. The mixture was poured into water and filtered, removing a small amount of insoluble material. The filtrate was acidified and the precipitate was filtered, washed and dried. The product was extracted with hot benzene and was dried to obtain N-methyl tetrachlorohydroxybenzamide, a colorless solid, having a neutralization equivalent of 292 (theory 289).

Example 3.—Preparation of N,N-dimethyltetrachlorohydroxybenzamide 0.1 gram mole of N,N-dimethyl-2,3,4,5,6-pentachlorobenzamide, 0.23 gram mole of NaOH and approximately 300 grams of ethylene glycol were heated at about 140 degrees centigrade until the evolution of chloride was practically theoretical. The reaction mixture was poured into water, and filtered, removing a small amount of insoluble material. The filtrate was acidified and the precipitate was filtered out, washed with water, and dried. The product was extracted with hot hexane to remove soluble impurities and was dried to obtain N,N-dimethyltetrachlorohydroxybenzamide, a colorless solid, having a neutralization equivalent of 298 (theory 303).

Analysis.—Calculated for $C_9H_7O_2NCl_4$: N, 4.84 percent; Cl, 49.2 percent. Found: N, 98 percent; Cl, 49.1 percent.

Example 4.—Preparation of tetrachlorohydroxybenzanilide 0.1 gram mole of 2,3,4,5,6-pentachlorobenzanilide, 0.22 gram mole of NaOH and approximately 300 grams of ethylene glycol were heated at 125 to 145 degrees centigrade until about 0.1 mole of chloride ion was released. The reaction mixture was poured into water and filtered, removing a small amount of insoluble material. The filtrate was acidified, filtered, washed and dried, then recrystallized from hot benzene to obtain tetrachlorohydroxybenzanilide, a colorless solid, M.P. 208 to 208.5 degrees, having a neutralization equivalent of 347 (theory 351).

Analysis.—Calculated for $C_{13}H_7O_2NCl_4$: N, 3.99 percent; Cl, 40.4 percent. Found: N, 3.92 percent; Cl, 39.9 percent.

Example 5.—Preparation of N-3,4-dichlorophenyltetrachlorohydroxybenzanilide 0.11 gram mole of 2,3,4,4',5,5',6-heptachlorobenzanilide, 0.22 gram mole of NaOH and approximately 300 grams of ethylene glycol were heated at about 140 degrees centigrade, for two days. The reaction mixture was poured into water and was filtered, removing a small amount of insoluble material. The filtrate was acidified, filtered, washed and dried. The product was extracted with hot hexane to remove soluble impurities and was dried, to obtain N - 3,4 - dichlorophenyltetrachlorohydroxybenzanilide, a colorless solid, having a neutralization equivalent of 418 (theory 420).

Analysis.—Calculated for $C_{13}H_5O_2NCl_4$: N, 3.31 percent. Found: N, 3.33 percent.

Example 6.—Preparation of N,N-diethyltetrachlorohydroxybenzamide 0.1 gram mole of N,N-diethyl - 2,3,4,5,6 - pentachlorobenzamide, 0.22 gram mole of NaOH and approximately 300 grams of ethylene glycol were heated at about 140 degrees centigrade for two days. The reaction mixture was poured into water and filtered. The filtrate was acidified, refiltered, washed with water and dried, to obtain N,N-diethyltetrachlorohydroxybenzamide, a colorless solid, having a neutralization equivalent of 399 (theory 331).

Example 7.—Preparation of N,N-diisopropyltetrachlorohydroxybenzamide 0.1 gram mole of N,N-diisopropyl-2,3,4,5,6-pentachlorobenzamide, 0.22 gram mole of NaOH and approximately 300 grams of ethylene glycol were heated at about 140 degrees centigrade of two days. The reaction mixture was poured into water and filtered. The filtrate was acidified, refiltered, washed with water and dried, to obtain N,N-diisopropyltetrachlorohydroxybenzamide, a colorless solid, having a neutralization equivalent of 358 (theroy 359).

Example 8.—Preparation of N,N-dibutyltetrachlorohydroxybenzamide 0.1 gram mole of N,N-dibutyl-2,3,4,5,6-pentachlorobenzamide, 0.22 gram mole of NaOH and approximately 320 grams of methanol were heated in an autoclave at 140 degrees centigrade for forty-three hours. The reaction mixture was poured into water and filtered, removing a small amount of insoluble material. The filtrate was acidified, filtered, washed with hot water and dried, to obtain N,N - dibutyltetrachlorohydroxybenzamide, a colorless solid, having a neutralization equivalent of 330 (theory 331).

Example 9.—Herbicidal method

Greenhouse flats were seeded with ragweed, crabgrass, lambsquarters and pigweed, and soybeans and were then sprayed with aqueous dispersions of various of the chemicals of the invention at a rate equivalent at 12 pounds per acre. Two weeks later, weed control and the condition of the beans were estimated, with the following results:

| Chemical | Weed control [1] | Condition of soybeans |
|---|---|---|
| N-methyltetrachlorohydroxybenzamide [2] | 80 | No damage. |
| N-N-dimethyltetrachlorohydroxybenzamide.[2] | 100 | Do. |
| N,N-diethyltetrachlorohydroxybenzamide.[2] | 70 | Do. |
| N,N-diisopropyltetrachlorohydroxybenzamide.[2] | 80 | Do. |

[1] Percent suppression relative to unsprayed flats.
[2] Isomer mixture, predominantly o-hydroxy and p-hydroxy, prepared by the method of Examples 2, 3, 6 and 7.

Example 10.—Fungicidal method

Tomato plants inoculated with spores of *Alternaria solani*, the causative fungus of early blight disease, were sprayed with 0.04 percent dispersions of several of the chemicals of the invention. Substantially 100 percent prevention of the disease symptoms (lesions) was noted when the plants were inspected two weeks later, in the case of those plants treated with the anilide and the p-chloroanilide of tetrachlorosalicylic acid. Substantial (about 50 percent) repression of leaf lesions was noted with the 3,4-dichloroanilide of tetrachlorohydroxybenzoic acid.

Example 11.—Nematocidal method

N,N-dibutyltetrachlorobenzamide was incorporated into soil infested with *Meloidogyne incognita*, a nematode causative of root knot disease of various crop plants, at the rate of 0.125 gram of chemical per quart of soil. Tomato seedlings were planted therein, and their roots were examined two weeks later. Substantially complete prevention of root knotting was observed. Similar seedlings planted in the same infested soil without the chemical were heavily damaged by root galls and lesions.

Example 12.—Bacteriostatic method

Various of the chemicals of the invention were incorporated into nutrient broth inoculated with cultures of *Staphylococcus aureus* and *Escherichia coli*. The growth or lack of growth of the bacterial colonies was noted after a two-day incubation period.

| | Minimum concentration giving bacteriostasis, percent | |
|---|---|---|
| | S. aureus | E. coli |
| 3,4,5,6-tetrachlorohydroxybenzoic acid | 0.020 | 0.0200 |
| Tetrachlorohydroxybenzanilide | 0.0019 | 0.0038 |
| Tetrachlorohydroxybenzo-p-chloroanilide (mixed o-hydroxy and p-hydroxy isomers) | 0.0010 | 0.0038 |
| Tetrachlorohydroxybenzo-3,4-dichloroanilide (i.e., N-(3,4-dichlorophenyl) tetrachlorohydroxy-benzamide) | 0.0010 | 0.0038 |

Example 13.—Relative bactericidal activity of the 2-hydroxy and 4-hydroxy isomers of tetrachlorohydroxybenzo-p-chloranilide Various concentrations of the isomers in water were prepared and applied to paper pads impregnated with spores of *Bacillus subtilus*, plus a blue dye which is reduced to a colorless form by the actively metabolizing bacteria. Bactericidal activity is indicated by the persistence of the blue color. After application of the test chemical, the paper test pads were subjected to an incubating temperature of 36 degrees centigrade for 4 hours and then inspected for bactericidal activity. The observed bactericidal activity of the two isomers as well as a mixture of the isomers is shown below:

| | Concentration | |
|---|---|---|
| | 100 p.p.m. | 10 p.p.m. |
| p-Hydroxy isomer (product of Example 1 having a melting point of 264.5 degrees centigrade). | Active | Inactive. |
| o-Hydroxy isomer (product of Example 1 having a melting point of 200-201.5 degrees centigrade). | do | Active. |
| Mixture of o- and p-hydroxy isomers (prepared in accordance with Example 1). | do | Do. |

Example 14.—Antibacterial soap composition

An antibacterial soap composition was prepared by blending and compressing together 1 part of the mixed isomers of tetrachlorohydroxybenzo-p-chloroanilide, prepared in accordance with the procedure of Example 1, and 99 parts of soap consisting essentially of sodium stearate.

Example 15.—Molluscicidal tests

Aqueous solutions of the test chemicals were made at various concentrations, and into 1 liter of each solution were placed five snails of the species *Planorbis corneus*. After 24 hours in the test solution followed by 24 hours in fresh water, the number of dead snails was determined, with the following results:

| Chemical | Kill of concentration | | |
|---|---|---|---|
| | 5 p.p.m. | 1 p.p.m. | 0.5 p.p.m. |
| Mixture of 2-hydroxy 3,4,5,6-tetrachloro-benzanilide and 4-hydroxy-2,3,5,6-tetrachlorobenzanilide | 3 | 3 | 0 |
| Mixture 2-hydroxy-3,4,5,6-tetrachloro-benzo-p-chloroanilide and 4-hydroxy-2,3,5,6-tetrachloro-benzo-p-chloroanilide | 5 | 5 | 4 |
| 4-hydroxy-2,3,5,6-tetrachloro-benzo-p-chloroanilide | | | 2 |
| Mixture 2-hydroxy-3,4,5,6-tetrachloro-benzo-3,4-dichloroanilide-chlorobenzanilide and 4-hydroxy-2,3,5,6-tetrachloro-benzo-3,4-dichloroanilide | 5 | 5 | 5 |
| No chemical added | 0 | 0 | 0 |

The composition of the instant invention may be used in the form of dust, or a spray and may be used in admixture with a substance, for example, a diluent or a solvent, a wetting, emulsifying, or adhering agent.

What is claimed is:

1. A method for the control of bacteria, fungi, nematodes, and weed pests which comprises applying to the locus to be treated a pesticidal amount of a compound of the formula

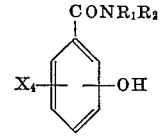

wherein X is selected from the group consisting of chlorine and bromine, $R_1$ and $R_2$ are substituents selected from the group consisting of hydrogen, alkyl, phenyl, benzyl, halophenyl, alkylphenyl and nitrophenyl, wherein the alkyl is of 1 to about 20 carbon atoms.

2. A method according to claim 1 wherein said compound is of the formula

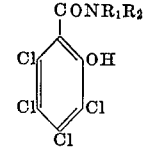

wherein $R_1$ is hydrogen and $R_2$ is selected from the group consisting of phenyl, halophenyl, alkylphenyl and nitrophenyl.

3. A method according to claim 1 wherein said compound of the formula

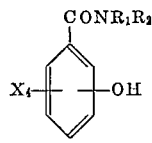

wherein X is selected from the group consisting of chlorine and bromine and $R_1$ and $R_2$ are substituents selected from the group consisting of hydrogen and alkyl.

4. Method according to claim 1 for the control of weeds comprising the application of the locus of said weeds of a phytotoxic amount of a compound of the formula:

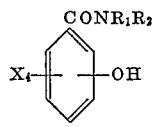

wherein X is selected from the group consisting of chlorine and bromine and $R_1$ and $R_2$ are substituents selected from the group consisting of hydrogen and alkyl.

5. The method of claim 4 wherein X is chlorine, the OH radical is located in either the ortho or para position with respect to the $CONR_1R_2$ group and $R_1$ and $R_2$ are both lower alkyl.

6. A method according to claim 1 for the control of fungus diseases which comprises applying a fungicidal amount of a compound of the formula:

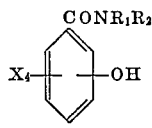

wherein X is selected from the group consisting of chlorine and bromine, $R_1$ and $R_2$ are substituents selected from the group consisting of hydrogen, alkyl, phenyl, benzyl, halophenyl, alkylphenyl and nitrophenyl.

7. A method according to claim 1, for the control of nematodes which comprises applying a nematocidal amount of a compound of the formula:

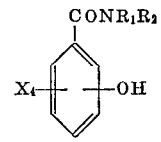

wherein X is selected from the group consisting of chlorine and bromine, $R_1$ and $R_2$ are substituents selected from the group consisting of hydrogen, alkyl, phenyl, benzyl, halophenyl, alkylphenyl and nitrophenyl.

8. A method according to claim 1 for the control of bacteria which comprises applying a bacterostatic amount of a compound of the formula:

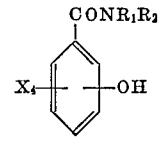

wherein X is selected from the group consisting of chlorine and bromine, $R_1$ and $R_2$ are substituents selected from the group consisting of hydrogen, alkyl, phenyl, benzyl, halophenyl, alkylphenyl and nitrophenyl.

References Cited

UNITED STATES PATENTS

| | | | |
|---|---|---|---|
| 2,394,916 | 2/1946 | Jones | 71—2.6 |
| 2,412,510 | 12/1946 | Jones | 71—2.6 |
| 3,014,965 | 12/1961 | Newcomer et al. | 71—2.6 |
| 2,703,332 | 3/1955 | Bindler et al. | 260—559 |
| 3,041,236 | 6/1962 | Stecker | 167—31 |
| 3,079,297 | 2/1963 | Schraufstatter et al. | 167—31 |

OTHER REFERENCES

Faust et al.: Amer. Pharm. Assoc. Jour. 45, pp. 514–517 (1956).

ALBERT T. MEYERS, Primary Examiner

J. D. GOLDBERG, Assistant Examiner

U.S. Cl. X.R.

424—233, 324